Figure 1:
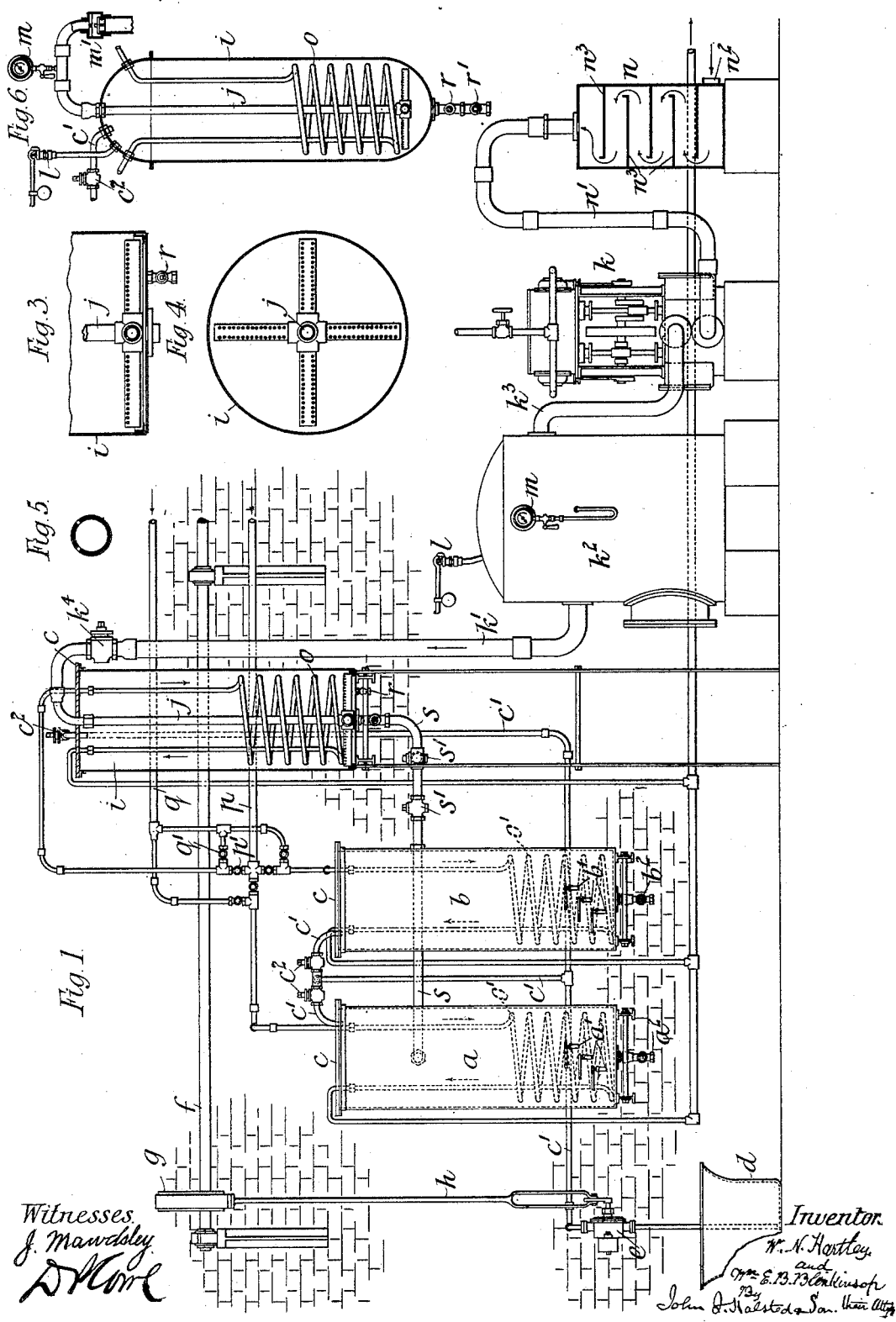

(Specimens.)

W. N. HARTLEY & W. E. B. BLENKINSOP.
PROCESS OF DECOLORIZING VEGETABLE OILS.

No. 467,992. Patented Feb. 2, 1892.

(Specimens.)

W. N. HARTLEY & W. E. B. BLENKINSOP.
PROCESS OF DECOLORIZING VEGETABLE OILS.

No. 467,992. Patented Feb. 2, 1892.

Witnesses.
J. Mawdsley.

Inventors.
W. N. Hartley.
Wm. E. B. Blenkinsop.
By their Attys
John J. Halsted & Son

UNITED STATES PATENT OFFICE.

WALTER NOEL HARTLEY, OF DUBLIN, IRELAND, AND WILLIAM EDMUND BRANDFORD BLENKINSOP, OF LONDON, ENGLAND.

PROCESS OF DECOLORIZING VEGETABLE OILS.

SPECIFICATION forming part of Letters Patent No. 467,992, dated February 2, 1892.

Application filed December 18, 1890. Serial No. 375,097. (Specimens.)

*To all whom it may concern:*

Be it known that we, WALTER NOEL HARTLEY, residing at Dublin, Ireland, and WILLIAM EDMUND BRANDFORD BLENKINSOP, residing at London, England, subjects of the Queen of Great Britain, have invented new and useful Improvements in Decolorizing Vegetable Oils in the Manufacture of Pale Drying Oils and Varnishes and Apparatus Therefor; and we do hereby declare that the following is a full, clear, and exact description of the invention, which will enable others skilled in the art to which it appertains to make and use the same.

Our invention relates to improvements in decolorizing vegetable oils and in the manufacture of pale drying oils and varnishes by a process of oxidation which removes or destroys the natural coloring-matter which vegetable oils contain.

In carrying out our invention we add to the oil to be treated a manganese salt of a suitable fatty acid or other organic compound of manganese (such as the oleate of manganese) easily soluble in oil, or we add a mixture of the manganese salts of more than one fatty acid, or other suitable organic compounds of manganese. We prefer to use the manganese salt or salts of the acid or acids naturally contained in the oil to be treated; but this is not essential, because we have found that we can use the manganese salts of the acids contained in other oils. For instance, in decolorizing linseed-oil we have prepared a soap from cotton-seed oil by saponifying it with an alkali and decomposing the soap with a pure salt of manganese, such as the sulphate. The manganese soap—that is to say, the combination of manganese with the fatty acid or acids of the oil—is very soluble both in oil and in turpentine. We find that it is convenient to make a solution of one part, by weight, of the manganese soap in two parts, by weight, of turpentine, or thereabout. We add one measure of this solution to eight hundred measures of oil, or one measure to four hundred measures of oil, or such other proportion as may prove more suitable for any particular oil; but these proportions we have found to be very effective. The mixture of oil and manganese soap is allowed to stand until the impurities have separated, and these are removed by subsidence or otherwise. The clear oil thus obtained is then treated in an apparatus which consists of a tank with arrangements for purifying and for passing air or oxygen through the oil in the said tank. The oil is treated at a suitable temperature, which need not exceed 212° Fahrenheit, and we generally maintain it at or about 190° Fahrenheit by suitable means, such as a steam-coil. The change in the color will take place at ordinary temperatures, and it is not necessary to employ artificial heat; but it is more convenient. Should the temperature rise too high, which it is liable to do, the oil can be cooled by passing cold water through the coil. The oil becomes darker in color after a considerable volume of air or suitable volume of oxygen has been forced through it; but the froth becomes less yellow, and subsequently the oil becomes paler, showing that the yellow or greenish coloring-matter which was originally present has been removed or destroyed. The oil can then be drawn off for storage or otherwise. It will be obvious that the impurities in the oil, instead of being separated therefrom before treatment in our apparatus, may be separated therefrom after treatment; but it is more satisfactory to treat a clear oil.

In order to enable our invention to be more fully understood, reference is had to the accompanying drawings, in which—

Figure 2:
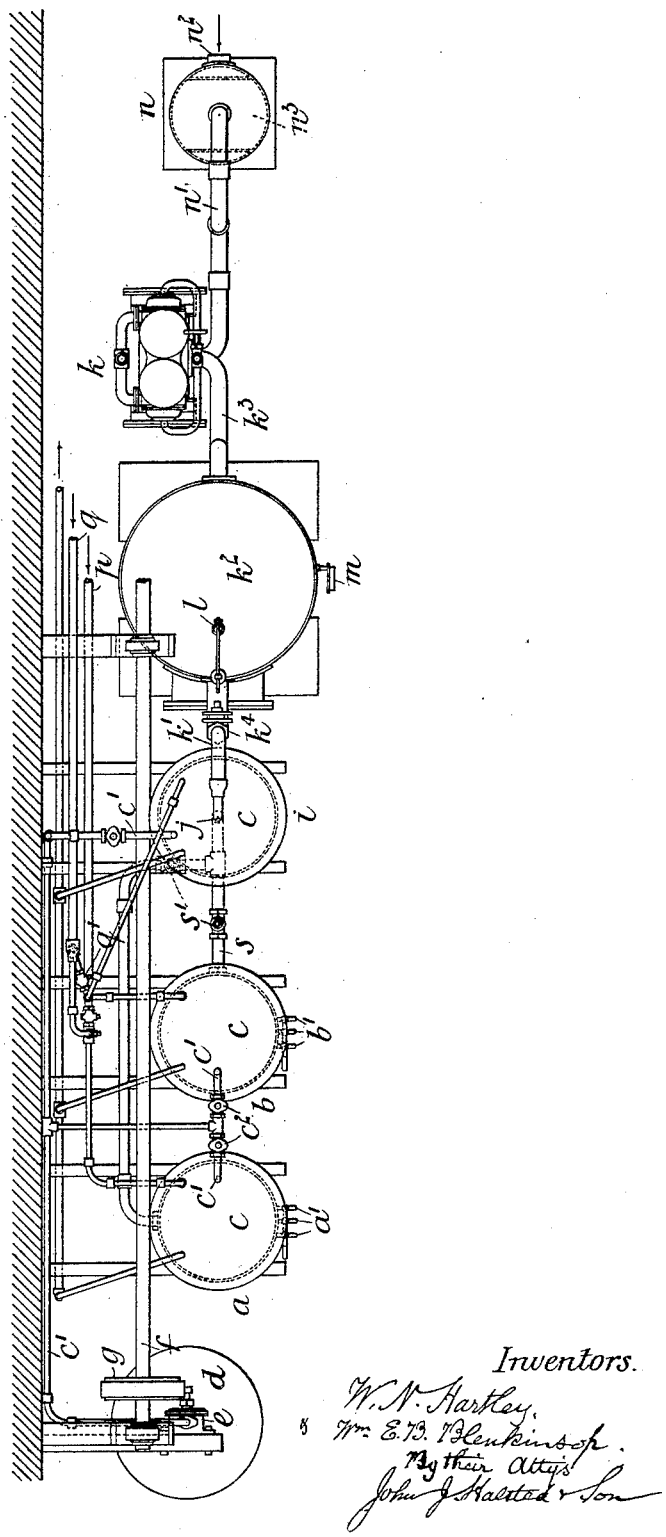

Figures 1 and 2 are a sectional elevation and a plan, respectively, of an arrangement of apparatus adapted for carrying out our process. Figs. 3 and 4 are a vertical and horizontal section of a portion of one of the vessels or tanks, drawn to a larger scale; and Fig. 5 is a detail of the same. Fig. 6 is a vertical section of a closed tank which we use when pressure is employed.

*a* and *b* are open vessels or tanks provided with loose covers *c c*, into either of which tanks the vegetable oil to be decolorized can be introduced for treatment by the manganese soap, such introduction being effected through pipes *c' c'* from a tank *d* by means of a suitable pump—such as *e*—driven from a rotating shaft $f$ by an eccentric $g$ and rod $h$. The pipes $c'$ $c'$ are also connected with another open vessel or tank $i$, hereinafter described, and also provided with a loose cover $c$.

$c^2$ $c^2$ are cocks for governing the admission of the oil to the said tanks $a, b,$ and $i$.

$a'$ and $b'$ are cocks on the tanks $a$ and $b$, respectively, for ascertaining when the impurities have separated from the oil, and $a^2$ and $b^2$ are cocks for drawing off such impurities, and after that the clear oil, which is then introduced again into the tank $d$ and pumped into the tank $i$, which latter tank serves to allow of the air or oxygen being passed through the oil. This is effected by means of a pipe $j$, provided at its lower end, which is located at the bottom of the tank $i$, with perforated branches, as shown clearly in Figs. 3 and 4, which represent, respectively, a vertical section and plan of the lower portion of the said tank and pipe.

Fig. 5 is a section through one of the branches of the pipe $j$, showing that the perforations are inclined so as to distribute the air or oxygen through the oil. The air or oxygen is forced through the pipe $j$ by a suitable blowing-engine $k$, to which it is connected by the pipe $k'$, air-vessel $k^2$, and pipe $k^3$.

The pipe $k'$ is provided with a valve $k^4$ to control the supply of air or oxygen to the tank $i$, and the air-vessel $k^2$ is provided with a relief-valve $l$ and pressure-gage $m$.

$n$ is the air or oxygen purifier, which is connected by a pipe $n'$ to the blowing-engine $k$, and consists of a chamber having an opening $n^2$ at its lower end and provided with a number of trays $n^3$, carrying caustic soda, over which the air or oxygen is drawn by the said blower, as indicated by the arrows in Fig. 1.

$o$ is the coil in the tank $i$, through which steam can be passed from a steam-supply pipe $p$, in order to heat the oil in the said tank and through which cold water can also be passed from a cold-water-supply pipe $q$ if the temperature of the oil rises too high.

$p'$ and $q'$ are cocks for controlling the supply of steam and cold water, respectively, to the coil $o$.

$r$ is a cock at the bottom of the tank $i$ for drawing off the oil when treated.

When separating the impurities from the oil after treatment with the air or oxygen instead of before, we first charge the tank $i$ with the oil where it can be treated with the manganese soap, as hereinbefore described, and we cause such air or oxygen to pass through it, after which we cause it to pass into either of the tanks $a$ and $b$ through a pipe $s$, and the impurities are then allowed to settle. $s'$ $s'$ are cocks for controlling the supply of oil to the said tanks.

The tanks $a$ and $b$ are also provided with coils $o'$ $o'$, connected to the pipes $p$ and $q$, so as to heat and cool the oil contained therein, if required.

We sometimes treat the oil with air or oxygen at a pressure greater than that of the atmosphere, in which case the oil is placed in a closed vessel, which is provided with a relief-valve for the escape of the excess of air or oxygen and vapors. A pipe for the passage of the air or oxygen and a coil are used as in the open tank $i$. This vessel is illustrated in vertical section in Fig. 6, $j$ being the air or oxygen pipe, which is provided with a pressure-gage $m$ and back-pressure valve $m'$. $l$ is the relief-valve; $o$, the coil; $c'$, the inlet, and $r$ $r'$ cocks for drawing off and sampling the oil.

Instead of pumping air through the oil we have sometimes made use of an exhausting apparatus, by which air is drawn through a closed vessel containing the oil. This may be accomplished with an apparatus similar to that shown at Fig. 6 if a Körtings steam-jet exhauster be attached at $c^2$ and the air-pipe $j$ be disconnected from the pumps at the joints near $m$.

In manufacturing what is known as "boiled oil," "boiled linseed-oil," "pale linseed-oil," "varnish," or other pale drying oils or varnishes the manganese salt or salts should be prepared from drying-oils. We employ by preference manganese linoleate—that is to say, the manganese soap prepared from the fatty acids in linseed-oil. The manganese linoleate is dissolved in oil or in turpentine or other suitable solvent in the proportion of one part, by weight, of manganese linoleate to two parts, by weight, of turpentine. We add the solution of manganese linoleate to the oil in the proportion of one measure to eight hundred measures of the oil, or in such other proportions as the nature of the oil to be produced may render desirable. A larger proportion of linoleate solution produces an oil which dries more rapidly; but when the proportion is increased beyond two measures of the solution to one hundred measures of the oil a very pale color is more difficult to obtain. The manganese oxides formerly used are added to the oil and macerated in it at ordinary atmospheric temperature, and air is passed through the oil. The manganese oxides do not saponify the oil—that is to say, they do not simply liberate glycerine and form a soap with the fatty acids—but they become oxidized in presence of air, and in doing so they oxidize the oil with which they are in contact. The first effect of such oxidation is the production of formic and acetic acids as well as acrolein. A portion of the manganese oxide then combines with the formic and acetic acids; but the salts so formed are not active as bleaching agents and are imperfectly soluble in oils. Moreover, acetate of manganese acquires a permanent brown color. It is by no means certain that the manganese compounds of the fatty acids most abundant in oils—such as palmitate, stearate, and oleate—are formed in any considerable quantity by this process.

The advantages of previously adding a suitable proportion of manganese soap to a batch of oil, overadding a manganese oxide to a batch of oil, and thus allowing a manganese soap subsequently to form within such batch of oil are the following:

In the first place, we have found that oils are bleached by our process to a degree which is beyond comparison better than any result that can be obtained by adding manganese oxide to a batch of oil.

Secondly. To obtain the best effect, the manganese compound must be adjusted with great care and nicety, so as not to exceed a certain proportion of the oil, otherwise the oil will not bleach properly, though it may become paler in color. A manganese soap prepared with great care from pure manganese sulphate and from which all alkaline salts and other impurities have been removed is easily soluble in oil and in turpentine, and a solution of the soap in these liquids is capable of rapid and complete admixture in any required proportion with the oil and without the aid of heat.

Thirdly. The usual preparations of manganese oxide will not readily and entirely dissolve in oil and they are soluble only in hot oil. They carry impurities into the oil which are more or less injurious. These impurities render the oil turbid, which turbidity requires weeks or months for subsidence, and in some cases subsidence becomes impossible. The impurities likewise impair the drying properties of linseed-oil.

Having now particularly described and ascertained the nature of our said invention and in what manner the same is to be performed, we declare that what we claim is—

1. The process of decolorizing vegetable oils by mixing an oil with a suitable proportion of a manganese soap or a fatty acid salt of manganese and blowing a current of air or oxygen into the mixture, substantially as described.

2. The process of decolorizing vegetable oils by mixing an oil with a suitable proportion of a manganese soap or a fatty acid salt of manganese mixed with a suitable solvent and blowing a current of air or oxygen into the mixture, substantially as described.

3. The process of decolorizing vegetable oils by mixing an oil with a suitable proportion of a manganese soap or a fatty acid salt of manganese mixed with linseed-oil and blowing a current of air or oxygen into the mixture, substantially as described.

4. The process of decolorizing vegetable oils by mixing the oil with a suitable proportion of manganese linoleate and blowing a current of air or oxygen into the mixture, substantially as described.

5. The process of decolorizing vegetable oils by mixing the oils with a suitable proportion of manganese linoleate dissolved in oil and blowing a current of air or oxygen into the mixture, substantially as described.

WALTER NOEL HARTLEY.
WILLIAM EDMUND BRANDFORD BLENKINSOP.

Witnesses to the signature of Walter Noel Hartley:
    THOS. SHEGOG,
    JAMES EVANS,
*Both of Royal College of Science.*

Witnesses to the signature of William Edmund Blandford Brenkinsop:
    W. C. BRAKENSHIRE,
    G. F. TYSON,
*Clerks to Messrs. G. F. Redfern & Co., of 4 South Street, Finsbury, London, Patent Agents.*